United States Patent [19]

Hayashi et al.

[11] E Patent Number: Re. 33,306

[45] Reissued Date of Patent: Aug. 21, 1990

[54] SECONDARY BATTERY OR CELL WITH IMPROVED RECHARGEABILITY

[75] Inventors: Hiroshi Hayashi, Otu; Masahiro Satoh, Kyoto, both of Japan

[73] Assignee: Sanyo Chemical Industries, Ltd., Kyoto, Japan

[21] Appl. No.: 254,966

[22] Filed: Oct. 7, 1988

Related U.S. Patent Documents

Reissue of:

[64] Patent No.: 4,615,959
Issued: Oct. 7, 1986
Appl. No.: 709,397
Filed: Mar. 7, 1985

[30] Foreign Application Priority Data

May 7, 1984 [JP] Japan ..... 59-91455

[51] Int. Cl.[5] ..... H01M 6/14; H01M 4/58

[52] U.S. Cl. ..... 429/194; 429/218; 429/232

[58] Field of Search ..... 429/218, 194, 232

[56] References Cited

U.S. PATENT DOCUMENTS

| | | | |
|---|---|---|---|
| 3,829,327 | 8/1974 | Omori et al. | 429/218 |
| 3,844,837 | 10/1974 | Bennion et al. | 429/218 X |
| 3,856,574 | 12/1974 | Amagi et al. | 429/218 |
| 4,136,213 | 1/1979 | Fung et al. | 429/218 X |
| 4,423,124 | 12/1983 | Dey | 429/194 |
| 4,423,125 | 12/1983 | Basu | 429/194 |
| 4,497,883 | 2/1985 | Murray | 429/194 |
| 4,707,423 | 11/1987 | Kalnin et al. | 429/194 |

*Primary Examiner*—Stephen J. Kalafut
*Attorney, Agent, or Firm*—Oblon, Spivak, McClelland, Maier & Neustadt

[57] ABSTRACT

A secondary battery or cell with improved rechargeability is obtained by combination of (A) a cathode active material comprising a chalcogen compound of a transition metal, (B) an electrolyte comprising an organic solvent having dissolved therein a lithium salt and (C) an anode active material comprising lithium metal in electrical contact with an electrically conductive carbonaceous material which is a pyrolysis residue of an organic material such as synthetic high polymers. The anode active material can be formed in situ within the battery, by self discharge of lithium metal into the carbonaceous material. The battery or cell is of excellent properties, such as stability or flatness of discharge voltage and electric capacity.

18 Claims, 1 Drawing Sheet

SECONDARY BATTERY OR CELL WITH IMPROVED RECHARGEABILITY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a secondary battery or cell, and particularly to a lithium cell containing nonaqueous electrolytes.

2. Description of the Prior Art

Recently, a secondary battery or cell, wherein a conjugated pyrolysis residue of a high polymer is used as a cathode and/or an anode, has been proposed [Japanese Laid-open Pat. No. 93176/1983].

One of the major problems limiting the successful development of rechargeable versions of lithium batteries is the nature of the lithium dendritic deposits during the charging mode of such batteries.

SUMMARY OF THE INVENTION

It is an object of the present invention to eliminate dendritic growth of lithium during the discharge-charge cycles in a lithium battery or cell.

As another object, this invention provides a secondary battery or cell having improved stability or flatness of discharge voltage and capacity.

It is still another object of the invention to provide a secondary battery or cell with an improved rechargeability or high discharge voltage, high energy density and large electric capacity in spite of little volumetric capacity.

A further object of this invention is to provide a secondary battery which is economical due to its use of easily obtainable active anode materials.

Briefly, these and other objects of the present invention, which will become more readily apparent below have been attained broadly by a secondary battery or cell with improved rechargeability, which comprises:

(A) a cathode active material comprising a chalcogen compound of a transition metal, (B) an electrolyte comprising an organic solvent having dissolved therein a lithium salt, and (C) an anode active material comprising lithium metal in electrical contact with an electrically conductive substantially amorphous carbonaceous material which is a pyrolysis residue of an organic material.

BRIEF DESCRIPTION OF THE DRAWING

The nature, objects and advantages of the invention will be more fully understood from the following description of a preferred embodiment shown by way of example in the accompanying drawing FIG. 1.

DETAILED DESCRIPTION OF THE PREFERRED EMBODIMENTS

Figure 1:
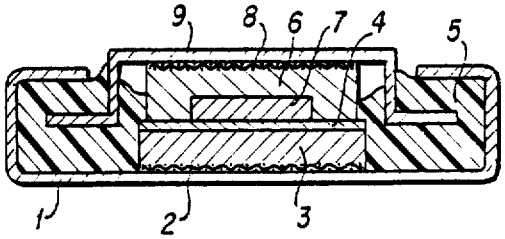
FIG. 1 is a schematic cross sectional view of a cell in accordance with the invention.

Suitable electrically conductive carbonaceous materials, used in electrical contact with lithium metal as anode active material in accordance with the present invention, include pyrolysis residues of organic materials, such as synthetic high polymers, natural high polymers, pitches, coals and the like. Suitable examples of these organic polymers are those used as precursor or raw materials for carbon and graphite fibers as described, for instance, in "CARBON AND GRAPHITE FIBERS Manufacture and Applications" (edited by Marshal Sittig, published by Noyes Data Corp. 1980).

Suitable synthetic high polymers include, for example, polyacrylonitrile, polyvinyl chloride, polyvinylidene, chloride, polyvinyl alcohol, polybutadiene, polyethylene, polymethylvinylketone, polyphenylenes (such as p-polyphenylene), polystyrene, polyacetylenes, polyarylacetylenes (such as polyphenylchloroacetylene), polyimides (such as polyoxydiphenylenepyrromellitic imide, polybenzoxazole imide, polyimidazopyrroloneimide, polyamidoimides, polyhydrazidoimide), polyamides, polybenzimidazoles, polysemicarbazides, polybenzoxadinones, epoxy resins, furan resins and phenolic resins.

Examples of suitable natural high polymers are wood, coconut shells, cellulosic materials (such as cellulose, regenerated cellulose, cellulose acetates and the like), starch, protein, wool, lignin and rubber.

These synthetic and natural high polymers may have a wide range of molecular weight. In general, the molecular weight (number average) of these polymers is at least 5000, preferably 10,000–1,000,000 or higher.

Exemplary of suitable pitches are petroleum pitch, coal tar pitch, wood tar pitch and rosin pitch.

Illustrative of coals are lignite, brown coal, subbituminous coal, bituminous coal and anthracite.

Among the organic materials, preferred are polyarylacetylenes and phenolic resins.

Illustrative of suitable polyarylacetylenes are those having repeating units of the following general formula (1):

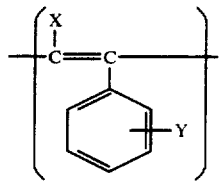

(1)

wherein X is Cl or methyl, and Y is H, Cl or methyl.

Suitable examples of arylacetylene monomers constituting the repeating units of the formula (1) include phenylacetylenes, such as 1-phenylpropyne; and halophenylacetylenes, such as 1-chloro-2-tolylacetylene, 1-chloro-2-chlorophenylacetylene, 1-chlorophenylpropyne and the like; as well as mixtures of two or more of them. Among these, preferred are halophenylacetylenes, particularly 1-chloro-2-phenylacetylene.

Polyarylacetylenes may include, if necessary, other repeating units than the repeating units of the formula (1). Suitable comonomers constituting the other repeating units include alkyl acetylenes, such as mono-alkyl($C_1$–$C_{20}$)acetylenes and di-alkyl($C_1$–$C_{20}$ and $C_1$–$C_5$)acetylenes. Illustrative of these acetylenes are 1-alkynes, such as t-butyl acetylene, t-pentyl acetylene, 4-methyl-1-pentyne, and 1-hexyne; 2-alkynes such as 2-hexyne, 2-octyne and 2-decyne, and mixtures of two or more of them.

In these copolymers composed of repeating units of the formula (1) and of alkyl acetylene, the content of the units of formula (1) is preferably at least 50%, more preferably at least 80% by weight based on the weight of the total monomer units.

Aryl acetylene polymers can be obtained by the methods described in "Polymer Bulletin", Vol. 2, page 823–827 (1980), and "Polymer Journal", Vol. 11, page 813(1979) and Vol. 13, page 301 (1981).

Arylacetylene polymers are light yellow or white solids, and usually have number-average molecular weight of at least about 5,000 (measured by osmometry), preferably about 10,000-about 1,000,000.

Suitable phenolic resins include polycondensation products of phenols with aldehydes or aldehyde precursors (such as formaldehyde, acetoaldehyde, furfural, paraformaldehyde and formal), in the presence of acidic catalysts (such as oxalic acid, hydrochloric acid) to form novolak resins or in the presence of alkaline catalysts (such as ammonia) to form resol resins. Examples of suitable phenols are phenol, resorcinol; mono- and di-alkyl phenols, such as o-, m- and p-cresols, xylenols, p-isopropylphenol, t-butylphenol and p-octylphenol; and aryl phenols, such as p-phenylphenol, 2-hydroxyphenyl-2-propylphenol and the like.

Exemplary of such phenolic resins are phenol-formalin resins, cresol-formalin resins, phenol-furfural resins, resorcinol-formalin resins, and the like; as well as modified phenolic resins, such as tercondensation polymers of phenols, aldehydes (such as formalin) and natural resins (such as drying oils, rosins and the like), etherified phenolic resins obtained by acidic etherification of methylol radicals of resols with monohydric alcohols (such as butanol).

The polycondensation degree of phenolic resins is preferably at least 5. Uncured resins may be used (precondensates), as well as cured resins.

Pyrolysis residues of the organic materials used in this invention, can be produced by known pyrolysis methods. Pyrolysis-or carbonization is ordinarily performed by heating or thermal treatment of the abovementioned organic materials in an atmosphere of inert gas, such as nitrogen, to a temperature sufficiently high to bring about substantially complete thermal decomposition of noncarbon constituents of the organic material, which temperature is not so high as to bring about substantial graphitization of the resulting pyrolyzed or carbonized material. The temperature of the thermal treatment is generally about 300° to about 1700° C., preferably about 500° to about 1500° C.; and the heating period is ordinarily 1 to 50 hours, preferably 2 to 20 hours. The heating temperature may be raised stepwise, for example, by heating to a temperature of 300° to 600° C. for 0.5–10 hours, followed by an increase to a temperature of 600° to 1500° C. for 1–10 hours.

Pyrolysis residues used in the invention, may be activated pyrolyzed residues, for example, those activated by steam activation, drug activation and other activation methods (such as partial oxidation by heating in air, carbon dioxide gas or chlorine gas). Examples of suitable activated pyrolyzed residues include activated charcoals, obtained by activating by conventional methods, pyrolyzed residues of a natural high polymer (such as wood, coconut shell, sawdust, lignin, cattle bone and blood) and coals (such as peat, lignite, brown coal). Activated charcoals are described in "ENCYCLOPAEDIA CHIMICA" Vol. 2, page 437–438, published by Kyoritsu Shuppan Co., Japan (1963), and Kirk-Othmer "ENCYCLOPEDIA OF CHEMICAL TECHNOLOGY" Vol. 2, page 149–158 published by John Wiley & Sons, Inc. (1963).

Pyrolysis residues (including those which are activated), used in the present invention, may be in the form of film, fiber, fabrics (woven fabric and non-woven fabric), thin plate and powder.

These carbonaceous materials (pyrolysis residues) are usually porous and preferably have a density of at most 1.8 g/cm$^3$. These materials have high electrical conductivity of usually at least $10^{-5}$ mho/cm, preferably at least $10^{-3}$ mho/cm, and exhibit a substantially amorphous X-ray diffraction pattern. [Natural graphites and artificial graphites made by heating at high temperature (such as 2500° to 4500° C.) and having a predominant X-ray diffraction pattern characteristic of graphite cannot be used for the anode active materials of the present invention.]

The anode active material (C) used in this invention comprises lithium metal in electrical contact with an electrically conductive carbonaceous material (pyrolysis residue). Electrical contact of the carbonaceous material with lithium metal may be accomplished, for example, by direct mounting of lithium metal on the surface of the carbonaceous material.

The cathode active material (A) in this invention comprises a chalcogen compound of a transition metal. Suitable transition metals include, for example, metals of Groups IB-VII and Group VIII of the long form periodic table, such as titanium, vanadium, chromium, manganese, cobalt, copper, iron, niobium and molybdenum. Examples of the chalcogen compounds are chalcogenides, such as oxides, sulfides and selenides, of the above-mentioned metals. Illustrative examples of suitable chalcogenides are: oxides such as $TiO_2$, $Cr_3O_8$, $V_2O_5$, $MnO_2$, $LiCoO_2$, CuO and $MoO_3$; sulfides such as $TiS_2$, $VS_2$, $Cr_{0.5}V_{0.5}S_2$, $CuCo_2S_4$, FeS and $MoS_3$; and selenides such as $VSe_2$ and $NbSe_3$. Among these, preferred are $MnO_2$ and $V_2O_5$.

Cathode active materials are generally used in the form of molded items. For example, a powder of cathode active materials or a mixture thereof with binders (such as polytetrafluoroethylene, polyethylene, polystyrene) can be sintered within a mold under pressure to form molded pieces.

The electrolyte (B) employed in the invention comprises an organic solvent having dissolved therein a lithium salt. Examples of suitable organic solvents are esters, ethers, oxazolidinones, amides, nitriles, aldehydes and ketones as described below, as well as mixtures of two or more of them.

(a) Esters (a-1) alkylene carbonates, such as ethylene carbonate, propylene carbonate and the like;

(a-2) lactones, such as gamma-butyrolactone and the like;

(a-3) other esters, including alkyl carboxylates, such as methyl and ethyl formates, acetates, butyrates and the like.

Among those, propylene carbonate is preferred.

(b) Ethers (b-1) non-cyclic ethers, including dialkyl ethers, such as t-butyl methyl ether, t-butyl ethyl ether, di-isopropyl ether and diethyl ether, and ethers derived from ethylene glycol and polyethylene glycols, such as 1,2-dimethoxyethane, diethyleneglycol dimethyl ether and the like;

(b-2) cyclic ethers, such as tetrahydrofuran, 2-methyltetrahydofuran 2,5-dimethyltetrahydrofuran, 1,3-dioxolane, 1,4-dioxane, pyrans, dihydropyran, tetrahydropyran and the like.

Among these, preferred are 2,5-dimethyltetrahydrofuran, t-butyl methyl ether and t-butyl ethyl ether.

(c) Oxazolidinones 3-substituted 2-oxazolidinones, including 3-alkyl-2-oxazolidinones, such as 3-methyl-2-oxazolidinone and 3-ethyl-2-oxazolidinone; 3-cycloalkyl-2-oxazolidinones, such as 3-cyclohexyl-2-oxazolidinone; 3-aralkyl-2-oxazolidinones, such as 3-benzyl-2-oxazolidinone; and 3-aryl-2-oxazolidinones, such as 3-phenyl-2-oxazolidinone.

Among these, preferred are 3-alkyl-2-oxazolidinones, particularly 3-methyl-2-oxazolidinone.

(d) Amides dialkyl-substituted amides, such as N,N-dimethylformamide, N,N-dimethylacetamide and the like; and closely related amide like compounds, such as N,N-dimethyl methyl carbamate and tetramethylurea.

(e) Nitriles such as acetonitrile, propionitrile, benzonitrile and the like.

(f) Aldehydes and ketones such as acetaldehyde, acetone and the like.

Among these organic solvents, are preferred propylene carbonate and mixtures thereof with ethers (particularly 2,5-dimethyltetrahydrofuran, t-butyl methyl ether and t-butyl ethyl ether) [Volume ratio: preferably 1/9 to 9/1, more preferably 2/8 to 8/2].

Suitable lithium salts useful for electrolyte include, for example, lithium perchlorate ($LiClO_4$), lithium borofluoride ($LiBF_6$), lithium borochloride ($LiBCl_6$), lithium arsenofluoride ($LiAsF_6$), lithium phosphofluoride ($LiPF_6$), lithium aluminate chloride ($LiAlCl_4$), lithium halides, such as lithium fluoride (LiF), lithium chloride (LiCl), lithium bromide (LiBr) and lithium iodide (LiI), and lithium trifluoromethane sulfonate, and the like.

The electrolyte (B) generally contains the lithium salt in an amount of 0.1 to 5 mole/l, preferably 0.5 to 3 mole/l.

The electrolyte (B) can be produced by dissolving lithium salts into organic solvents by any known methods, for instance, by mixing them optionally under heating and stirring.

Among preferred electrolytes are the following:

(1) solutions of lithium perchlorate in mixed solvents of propylene carbonate and cyclic ethers, (2) solutions of lithium phosphofluoride in mixed solvents of 3-substituted-2-oxazolidinone and cyclic ethers, and (3) solutions of lithium trifluoromethane sulfonate in mixed solvents of 3-substituted-2-oxazolidinone and cyclic ethers.

The secondary battery or cell according to the present invention may be used for discharge with or without being allowed to stand after preparation of the cell.

In the case where the cell is allowed to stand, a reversible complex comprising the carbonaceous material containing lithium is formed spontaneously and the complex acts as the anode active material. By electrically contacting lithium metal with the carbonaceous material within the cell according to the present invention, the lithium metal is consumed by self-discharge and automatically contained into the carbonaceous material to form the anode active material in situ within the cell. For example, when a cell of this invention, containing manganese dioxide as the cathode active material and having an initial open circuit voltage of 3.3 V, is allowed to stand in a dark room for a week, the lithium metal is completely consumed to form a reversible complex comprising the carbonaceous material containing lithium and shows an open circuit voltage of about 3.0 V.

The above-mentioned self discharge reaction can be illustrated by the following equation:

$$\text{Carbonaceus material} + \text{Li} \rightarrow \text{Carbonaceous material} - \text{Li Complex}$$

Electromotive reactions in the cell of the invention can be shown in the following equations:

Cathode side $$MnO_2 + Li^+ + e^- \underset{\text{charge}}{\overset{\text{discharge}}{\rightleftharpoons}} MnO_2{-}Li$$

Anode side $$\text{Carbonaceous material-Li Complex} \underset{\text{charge}}{\overset{\text{discharge}}{\rightleftharpoons}} \text{Carbonaceous material} + Li^+ + e^-$$

In the case where the cell is used without allowing it to stand, the reversible complex comprising the carbonaceous material containing lithium is not yet completely formed, and both the complex and lithium metal act as the anode active material.

In the battery or cell of the present invention, the electrical capacity of the anode active material depends upon the quantity of electrically reversible lithium contained in the carbonaceous material.

The electrical capacity of the cathode material is ordinarily 1 to a 1.5 times, preferably equal to that of the anode active material.

Lithium metal is preferably used in an amount such that it provides about half of the total capacity of the cathode active material and the anode active material.

This invention will be described with reference to a preferred embodiment which is shown by way of example in FIG. 1.

The battery shown in FIG. 1 comprises: a cathode container (1) serving as the cathode terminal of the battery; a metal net (2) for collecting electricity; a cathode (3) comprising said cathode active material (A); a separator (4) containing said electrolyte (B); a gasket (5); said carbonaceous material (6), in electrical contact with lithium metal (7), as the anode active material (C); a metal net (8) for collecting electricity; and an anode container (9) which serves as the anode terminal of the battery.

The battery according to the invention can be produced for example, as follows: Onto the bottom of the cathode container (1) the metal net (2) and then the molded cathode (3), comprising the cathode active material (A) are placed and pressed to bond the cathode (3) to the container (1) interposing the metal net (2). Then, the separator (4) containing the electrolyte (B) is put on the cathode (3), followed by inserting the angle gasket (5) along the wall of the cathode container (1). After the carbonaceous material (6) mounted with lithium metal (7) is pressed to bond to the anode container (9) interposing the metal net (8) between (7) and (9), this anode assembly is put on the above mentioned separator (4) followed by bending the opening part of the anode container (9) inside for tight sealing.

In the battery of this invention, the lithium metal (7) may be inserted into any part of the anode side of the battery as long as the lithium metal (7) is in electrical contact with the carbonaceous material (6). For example, the lithium metal (7) may be inserted between the carbonaceous material (6) and the metal net (8).

Batteries or cells, containing the anode active material comprising lithium metal in electrical contact with the amorphous carbonaceous material according to the present invention, can effectively inhibit deposition on dendritic crystals of lithium in the anode side during repeated discharge-charge cycles, and exhibit high voltage, excellent stability or flatness of discharge voltage high energy density and large electric capacity, in spite of small volumetric capacity.

In addition, batteries or cells of the invention can be produced easily, the anode active material being formed in situ by self discharge of lithium metal electrically contacted with the carbonaceous material, and are therefore economically advantageous as compared with those produced by using lithium metal-containing anode active materials prepared beforehand.

Having generally described the invention, a more complete understanding can be obtained by reference to certain specific examples, which are included for purposes of illustration only and are not intended to be limiting unless otherwise specified.

EXAMPLE 1

Into a quartz tube, were placed 43 g of powdered poly(1-chloro-2phenyl acetylene) and the tube was heated to 500° C. within 2 hours under $N_2$ gas flow, the temperature being maintained for 1 hour. Then, the temperature was raised to 800° C. within 90 minutes, followed by maintaining the temperature for 3 hours to pyrolyze the polymer. After cooling under $N_2$ gas flow, 26.3 g of black powder of pyrolyzed poly(1-chloro-2phenyl acetylene) was obtained.

Two g of this powder and 0.02 g of polyethylene granules were well mixed and packed into a mold to form a plate of 1 mm thickness under a pressure of 400 $kg/cm^2$ G, and the plate was cut into a disk (6') of 16 mm diameter and 100 mg weight.

Separately, 130 mg of a cathode active material (3') which was formed by molding a mixture of manganese dioxide, acetylene black and polytetrafluoroethylene, was pressed so as to bond to a cathode container (1') of stainless steel, interposing an electron collecting metal net (2') between (3') and the bottom of (1').

Then, a glass mat separator (4'), having been immersed in with an organic electrolyte solution of lithium perchlorate in propylene carbonate having a concentration of 1 mole/l, was put on the cathode material (3'), followed by filling a proper gasket (5') into the opening of (1').

Onto 100 mg of the above-mentioned: (6') was mounted 8 mg of lithium metal foil (7'), and the mounted disk (6') was bonded to a stainless steel anode container (9'), interposing an electron collecting metal net (8').

The bonded anode was put on the separator (4'), and then the opening part of the cathode container (1') was bent to inside for tight sealing.

In this example, the lithium foil (7') was set to exist between the pyrolyzed residue (6') and the separator (4').

The initial open circuit voltage of this battery was 3.3 V, and after the battery was allowed to stand in dark room for a week, the open circuit voltage was 3.0 V. After carrying out a cycle test involving repeating 5 hours discharge and 5 hours charge at a constant current of 1 mA, the battery showed excellent charge and discharge properties with complete reversibility even after 200 cycles.

EXAMPLE 2

Immediately after producing a battery by repeating EXAMPLE 1, the battery was discharged at a constant current of 1 mA to 1.5 V cut-off voltage. The discharge capacity thus obtained was 25 mAH. Thereafter, a cycle test involving of repeating 5 hours discharge and 5 hours charge at a constant current of 1 mA, was carried out. The battery also showed excellent charge and discharge properties with complete reversibility even after 200 cycles.

EXAMPLE 3

EXAMPLE 1 was repeated except that the pyrolyzed residue obtained by heating a phenolic resin at 800° C. was used instead of the pyrolyzed residue of poly(1-chloro-2-phenylacetylene), and vanadium pentoxide was used instead of manganese dioxide. In this example, the pyrolyzed phenolic resin, the lithium metal foil and the cathode active material were used in amounts of 100 mg, 7.5 mg and 220 mg, respectively. In this case, the lithium foil was inserted between the pyrolyzed residue and the electron collecting nickel net of the anode.

The initial open circuit voltage was 3.4 V and the open circuit voltage after one week standing was 3.1 V. After carrying out cycle test involving repeating 10 hours discharge and 10 hours charge at a constant current of 1 mA, the battery showed excellent charge and discharge properties with complete reversibility even after 100 cycles.

EXAMPLE 4

EXAMPLE 1 was repeated except that a charcoal of coconut shells was used instead of the pyrolyzed poly (1-chloro-2-phenylacetylene), and 1 mole/l solution from lithium phosphofluoride in an equal volume mixture of propylene carbonate and 2,5-dimethyltetrahydrofuran was used as the electrolyte solution instead of the lithium perchlorate solution.

The initial open circuit voltage was 3.3 V, and open circuit voltage after 2 weeks standing was 2.98 V. After carrying out cycle test involving repeating 5 hours discharge and 5 hours charge at a constant current of 2 mA, the battery showed excellent charge and discharge properties with complete reversibility even after 100 cycles.

Comparative Example 1

EXAMPLE 1 was repeated except that graphite was used instead of the pyrolyzed poly(1-chloro-2-phenylacetylene).

The initial open circuit voltage was 3.3 V, and the open circuit voltage after one week standing was 2.0 V. After 5 hours discharge at a constant current of 1 mA, charging was attempted at the same current density, but this trial resulted in a failure.

What is claimed as new and desired to be secured by Letters Patent is:

1. A secondary battery or cell with improved rechargeability, which comprises:

(A) a cathode active material comprising a chalcogen compound of a transition metal, (B) an electrolyte comprising a organic solvent having dissolved therein a lithium salt, and (C) an anode active material comprising lithium metal in electrical contact with an electrically conductive substantially amorphous carbonaceous material having a conductivity of at least $10^{-5}$ mho/cm and a density of at most 1.8 g/cm$^3$, said carbonaceous material being a pyrolysis residue formed by heating at least one organic material selected from the group consisting of synthetic high polymers, natural high polymers, pitches and coals, in an inert atmosphere to a temperature ranging from about 300° C. to 1500° C., wherein said anode material is formed in situ within the secondary battery or cell, by self discharge of lithium metal into said carbonaceous material.

2. The secondary battery or cell of claim 1, wherein said organic material is at least one synthetic high polymer selected from the group consisting of polyacrylonitrile, polyvinyl chloride, polyvinylidene choride, polyvinyl alcohol, polybutadiene, polyethylene, polymethyl vinyl ketone, polyphenylene, polystyrene, polyacetylenes, polyarylacetylenes, polyimides, polyamides, polybenzimidazoles, polysemicarbazides, polybenzoxadinones, epoxy resins, furan resins and phenolic resins.

3. The secondary battery or cell of claim 1, wherein said organic material is at least one synthetic high polymer selected from the group consisting of polyarylacetylenes and phenolic resins.

4. The secondary battery or cell of claim 1, wherein said organic material is at least one synthetic high polymer selected from the group consisting of polyarylacetylenes having repeating units of the general formula:

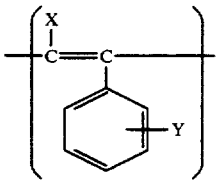

(1)

wherein X is Cl or methyl, and Y is H, Cl or methyl.

5. The secondary battery or cell of claim 1, wherein said pyrolysis residue is formed by heating the organic material in an inert atmosphere to a temperature sufficiently high to bring about substantially complete thermal decomposition of noncarbon constituents of the organic material.

6. The secondary battery or cell of claim 1, wherein said carbonaceous material is an activated pyrolysis residue of the organic material.

7. The secondary battery or cell of claim 1, wherein said pyrolysis residue is activated by steam activation, drug activation, or partial oxidation.

8. The secondary battery or cell of claim 1, wherein said pyrolysis residue is in the form of film, fiber, fabric, thin plate or powder.

9. The secondary battery or cell of claim 1, wherein the transition metal is selected from the group consisting of metals of Groups IB-VII and Group VIII of the long form periodic table.

10. The secondary battery or cell of claim 1, wherein said chalogen compound is a chalcogenide of at least one transition metal selected from the group consisting of titanium, vanadium, chromium, manganese, cobalt, copper, iron, niobium and molybdenum.

11. The secondary battery or cell of claim 1, wherein said organic solvent is at least one selected from the group consisting of esters, ethers, ketones, aldehydes, nitriles and amides.

12. The secondary battery or cell of claim 1, wherein the lithium salt is selected from the group consisting of $LiClO_4$, $LiPF_6$, lithium trifluoromethane sulfonate, LiCl, LiBr, LiI, $LiAsF_6$, $LiBF_4$, $LiBCl_4$ and $LiAlCl_4$.

13. The secondary battery or cell of claim 1, which comprises:

(1) a cathode container with an opening, (2) a first metal net for collecting electricity situated on an inner surface of said container, (3) said cathode active material (A) placed on top of said first metal net, (4) a separator containing said electrolyte (B) placed on top of said cathode active material, (5) a gasket placed so as to maintain the position of the previously recited elements, (6) said carbonaceous material placed on top of said separator, in electrical contact with (7) said lithium metal as anode active material (C), (8) a second metal net for collecting electricity situated on top of said carbonaceous material, and (9) an anode container having said anode active material situated onto an inner surface, placed into the opening of said cathode container.

*14. A secondary battery or cell with improved rechargeability, which comprises:*

*(A) a cathode active material comprising a chalogen compound of a transition metal,*

*(B) an electrolyte comprising a organic solvent having dissolved therein a lithium salt, and*

*(C) an anode active material comprising lithium metal in electrical contact with an electrically conductive substantially amorphous carbonaceous material having a conductivity of at least $10^{-5}$ mho/cm,*

*said carbonaceous material being a pyrolysis residue formed by heating at least one organic material selected from the group consisting of synthetic high polymers, natural high polymers, pitches and coals, in an inert atmosphere to a temperature ranging from about 300° C. to 1500° C.,*

*wherein said anode material is formed in situ within the secondary battery or cell, by self discharge of lithium metal into said carbonaceous material.*

*15. The secondary battery or cell of claim 14, which comprises:*

*(1) a cathode container with an opening,*

*(2) a first metal net for collecting electricity situated on an inner surface of said container,*

*(3) said cathode active material (A) placed on top of said first metal net,*

*(4) a separator containing said electrolyte (B) placed on top of said cathode active material,*

*(5) a gasket placed so as to maintain the position of the previously recited elements,*

*(6) said carbonaceous material placed on top of said separator, in electrical contact with*

*(7) said lithium metal as anode active material (C),*

*(8) a second metal net for collecting electricity situated on top of said carbonaceous material, and*

*(9) an anode container having said anode active material situated onto an inner surface, placed into the opening of said cathode container.*

*16. A secondary battery or cell with improved rechargeability, which comprises:*

*(A) a cathode active material comprising a chalcogen compound of a transition metal,*

*(B) an electrolyte comprising an organic solvent having dissolved therein a lithium salt, and*

*(C) an anode comprising an electrically conductive substantially amorphous carbonaceous material having a conductivity of at least $10^{-5}$ mho/cm containing lithium therein, said carbonaceous material being a pyrolysis residue formed by heating at least one organic material selected from the group consisting of synthetic high polymers, natural high polymers, pitches and coals, in an inert atmosphere to a temperature ranging from about 300° C. to about 1500° C.,*

*wherein said lithium is intercalated into said carbonaceous material upon charging the cell and said lithium is deintercalated from said carbonaceous material upon discharging the cell.*

*17. The secondary battery or cell of claim 14, wherein said carbonaceous material has a density of at most 1.8 g/cm$^3$, the density being a bulk density.*

*18. A secondary battery or cell with improved rechargeability, which comprises:*

*(A) a cathode active material comprising a chalcogen compound of a transition metal,*

*(B) an electrolyte comprising an organic solvent having dissolved therein a lithium salt, and*

*(C) an anode comprising an electrically conductive carbonaceous material having a conductivity of at least $10^{-5}$ mho/cm containing lithium therein, said carbonaceous material being substantially free from an X-ray diffraction characteristic of graphite, said carbonaceous material being a pyrolysis residue formed by heating at least one organic material selected from the group consisting of synthetic high polymers, natural high polymers, pitches and coals, in an inert atmosphere to a temperature ranging from about 300° C. to about 1500° C.,*

*wherein electromotive reactions proceed at the anode side according to the following equations:*

$$\text{Carbonaceous material-Li Complex} \underset{\text{charge}}{\overset{\text{discharge}}{\rightleftharpoons}} \text{Carbonaceous material} + Li^+ + e^-$$

* * * * *